(12) United States Patent
Jiang et al.

(10) Patent No.: US 11,036,078 B2
(45) Date of Patent: Jun. 15, 2021

(54) DISPLAY PANEL, DRIVING METHOD THEREOF, AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Li Jiang, Beijing (CN); Tongmin Liu, Beijing (CN); Heng Zhang, Beijing (CN); Jun Xu, Beijing (CN); Fei Chen, Beijing (CN); Aoxiang Li, Beijing (CN)

(73) Assignees: HEFEI BOE OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/401,445

(22) Filed: May 2, 2019

(65) Prior Publication Data

US 2020/0064686 A1 Feb. 27, 2020

(30) Foreign Application Priority Data

Aug. 23, 2018 (CN) .......................... 201810966792.6

(51) Int. Cl.
*G02F 1/1335* (2006.01)
*G02F 1/13357* (2006.01)
(52) U.S. Cl.
CPC .. *G02F 1/133528* (2013.01); *G02F 1/133514* (2013.01); *G02F 1/133602* (2013.01)

(58) Field of Classification Search
None
See application file for complete search history.

(56) References Cited

U.S. PATENT DOCUMENTS

| 10,327,308 | B2* | 6/2019 | Gagne-Keats | ......... H05B 47/11 |
| 10,484,623 | B2* | 11/2019 | Price | ..................... H04N 5/332 |
| 10,579,855 | B2 | 3/2020 | Zeng et al. | |
| 10,768,463 | B2 | 9/2020 | Yeo et al. | |
| 2008/0283728 | A1* | 11/2008 | Inoue | ................ H01L 27/14625 |
| | | | | 250/208.1 |
| 2013/0176283 | A1* | 7/2013 | Nakata | ................ G06F 3/03545 |
| | | | | 345/175 |
| 2015/0331508 | A1* | 11/2015 | Nho | ......................... G06F 3/042 |
| | | | | 345/173 |

(Continued)

FOREIGN PATENT DOCUMENTS

| CN | 106959757 A | 7/2017 |
| CN | 107680988 A | 2/2018 |
| KR | 10-2018-0064629 A | 6/2018 |

OTHER PUBLICATIONS

The First Chinese Office Action dated Jan. 5, 2021; Appln. No. 201810966792.6.

*Primary Examiner* — Ryan Crockett

(57) ABSTRACT

A display panel, a driving method thereof and a display device. The display panel includes a plurality of pixel units, the plurality of pixel units includes a first pixel unit, the first pixel unit includes a first sub-pixel, the first sub-pixel includes an infrared luminescent material on a display side, and the infrared luminescent material is capable of emitting infrared light under an irradiation of light emitted by the first sub-pixel.

11 Claims, 8 Drawing Sheets

(56) References Cited

U.S. PATENT DOCUMENTS

| | | | |
|---|---|---|---|
| 2016/0172399 A1* | 6/2016 | Nakata | H01L 27/14641 |
| | | | 348/308 |
| 2016/0266695 A1* | 9/2016 | Bae | G06F 3/04166 |
| 2017/0124376 A1* | 5/2017 | Wyrwas | G06K 9/2018 |
| 2019/0082519 A1* | 3/2019 | Gagne-Keats | G01J 1/08 |
| 2020/0089034 A1* | 3/2020 | Liu | G02F 1/133512 |
| 2020/0134281 A1* | 4/2020 | Han | H01L 27/3276 |
| 2020/0301187 A1* | 9/2020 | Lin | G02F 1/13338 |

* cited by examiner

DISPLAY PANEL, DRIVING METHOD THEREOF, AND DISPLAY DEVICE

This application claims priority to Chinese Patent Application No. 201810966792.6, entitled "display panel, driving method thereof, and display device," filed on Aug. 23, 2018, the disclosure of which is incorporated herein by reference in its entirety as a part of this application.

TECHNICAL FIELD

The embodiments of the present disclosure relate to a display panel, a driving method thereof, and a display device.

BACKGROUND

With the development of technologies, the functions of display devices are increasingly rich. For example, while realizing the display function, the display devices may also have fingerprint identification, iris identification, face identification and other functions. Fingerprint recognition, iris recognition, face recognition and other functions usually use the infrared light detection technology, that is, the display device emits infrared light, and the corresponding image is obtained by detecting the infrared light reflected by the user's fingers, iris, faces and other parts, so as to carry out recognition and judgment. In order to apply the infrared light detection technology, infrared light emitters are adopted. For example, an infrared light emitter is usually integrated in a display screen to emit infrared light as an infrared light source so as to cooperate with other components in a display device to realize corresponding functions.

SUMMARY

At least an embodiment of the present disclosure provides a display panel, which comprises a plurality of pixel units, the plurality of pixel units comprises a first pixel unit, the first pixel unit comprises a first sub-pixel, the first sub-pixel comprises an infrared luminescent material on a display side, and the infrared luminescent material is capable of emitting infrared light under an irradiation of light emitted by the first sub-pixel.

For example, in the display panel provided by at least an embodiment of the present disclosure, the first pixel unit is a self-luminous pixel unit, or the first pixel unit includes a light valve structure to allow backlight to pass or not.

For example, in the display panel provided by at least an embodiment of the present disclosure, the light valve structure is a liquid crystal light valve structure, the liquid crystal light valve structure comprises a first polarizer, a second polarizer, and a liquid crystal layer sandwiched between the first polarizer and the second polarizer, and polarization directions of the first polarizer and the second polarizer are perpendicular to each other.

For example, in the display panel provided by at least an embodiment of the present disclosure, the light valve structure further includes an array substrate and an opposite substrate, the first polarizer, the array substrate, the liquid crystal layer, the second polarizer, and the opposite substrate are sequentially stacked, and the infrared light emitting material is on the opposite substrate in the first subpixel, or the first polarizer, the array substrate, the liquid crystal layer, the opposite substrate, and the second polarizer are sequentially stacked, and the infrared luminescent material is on the second polarizer or the opposite substrate in the first sub-pixel For example, in the display panel provided by at least an embodiment of the present disclosure, the first sub-pixel, further includes an optical filter, the optical filter overlaps the infrared luminescent material, and the optical filter is closer to the array substrate relative to the infrared luminescent material to filter the backlight and cause the filtered backlight to irradiate the infrared luminescent material.

For example, in the display panel provided by at least an embodiment of the present disclosure, the opposite substrate is a color filter substrate, and the optical filter is on the color filter substrate.

For example, in the display panel provided by at least an embodiment of the present disclosure, the optical filter is a blue light filter, and the infrared luminescent material is a blue light excited infrared luminescent material.

For example, in the display panel provided by at least an embodiment of the present disclosure, in a case where the first polarizer, the array substrate, the liquid crystal layer, the opposite substrate, and the second polarizer are sequentially stacked, and the infrared light emitting material is located on the opposite substrate in the first subpixel, the light valve structure further includes a third polarizer, the third polarizer and the optical filter are stacked on the opposite substrate in the first subpixel, and the third polarizer is closer to the liquid crystal layer relative to the optical filter; or, the optical filter is closer to the liquid crystal layer relative to the third polarizer, and the infrared luminescent material is on the third polarizer.

For example, in the display panel provided by at least an embodiment of the present disclosure, the polarization directions of the third polarizer and the second polarizer are consistent.

For example, in the display panel provided by at least an embodiment of the present disclosure, the first pixel unit further includes a second sub-pixel, a third sub-pixel and a fourth sub-pixel, and the colors of the light emitted by the second sub-pixel, the third sub-pixel and the fourth sub-pixel are different.

For example, in the display panel provided by at least an embodiment of the present disclosure, the second subpixel is a red subpixel, the third subpixel is a green subpixel, and the fourth subpixel is a blue subpixel.

For example, in the display panel provided by at least an embodiment of the present disclosure, the plurality of pixel units further include a second pixel unit, and the second pixel unit comprises a fifth sub-pixel, a sixth sub-pixel, a seventh sub-pixel and an eighth sub-pixel, and colors of light emitted by the fifth sub-pixel, the sixth sub-pixel and the seventh sub-pixel are identical to those of the second sub-pixel, the third sub-pixel and the fourth sub-pixel, respectively.

For example, in the display panel provided by at least an embodiment of the present disclosure, the eighth sub-pixel is a white sub-pixel.

At least an embodiment of the present disclosure also provides a display device including the display panel according to any embodiment of the present disclosure.

At least an embodiment of the present disclosure also provides a driving method of the display panel according to any embodiment of the present disclosure, including: causing light emitted by the first sub-pixel to irradiate the infrared luminescent material to cause the infrared luminescent material to emit infrared light; or, causing the first sub-pixel not to emit light so that the infrared light emitting material does not emit infrared light.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1A:
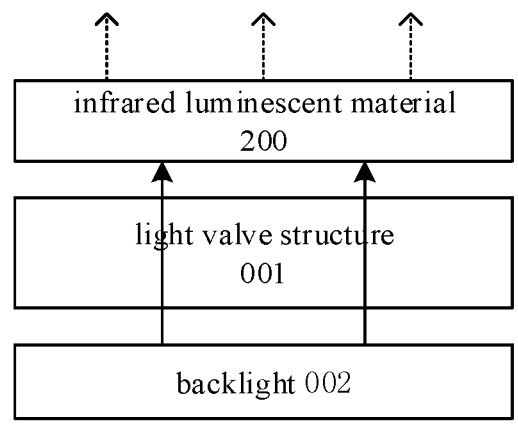
FIG. 1A and FIG. 1B are schematic diagrams showing the working principle of a display panel according to at least an embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently; the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly, "On," "under," "right," "left" and the like are only used to indicate relative position relationship, and when the position of the object which is described is changed, the relative position relationship may be changed accordingly.

In order to realize the infrared light detection technology, in mobile devices with a display function, it is usually necessary to separately dispose infrared light emitters therein, i.e. infrared light sources. This approach not only increases the weight and the structural complexity of the device, but also reduces the area of the effective display area due to the existence of infrared light sources, which is not conducive to the realization of a narrow bezel and a full screen device.

At least an embodiment of the present disclosure provides a display panel, a driving method thereof, and a display device. The display panel may emit infrared light without an infrared light source, the display function is not affected. It is possible to be compatible with the structure of a conventional display panel, and thus manufacturing costs may be reduced.

Hereinafter, embodiments of the present disclosure will be described in detail with reference to the accompanying drawings. It should be noted that the same reference numerals in different drawings will be used to refer to the same elements already described.

At least an embodiment of the present disclosure provides a display panel, which comprises a plurality of pixel units. The plurality of pixel units comprise a first pixel unit, the first pixel unit comprises a first sub-pixel, the first sub-pixel comprises an infrared luminescent material positioned on a display side, and the infrared luminescent material is capable of emitting infrared light under the irradiation of light emitted by the first sub-pixel.

Figure 1B:
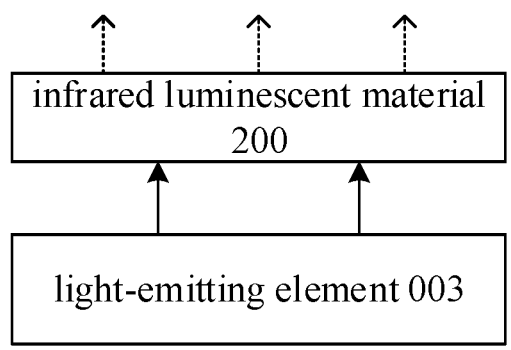
Figure 2:
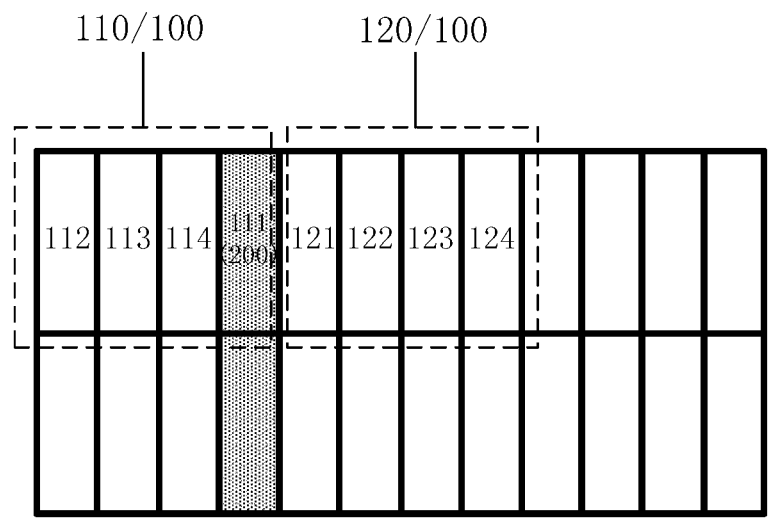
FIG. 2 is a schematic plan view of a display panel according to at least an embodiment of the present disclosure.

FIG. 1A and FIG. 1B are schematic diagrams of the working principle of a display panel provided by at least an embodiment of the disclosure, and FIG. 2 is a schematic plan view of a display panel provided by at least an embodiment of the disclosure. Referring to FIG. 1A, FIG. 1B and FIG. 2, the display panel 10 includes a plurality of pixel units 100, the plurality of pixel units 100 includes a first pixel unit 110, and the first pixel unit 110 includes a first sub-pixel 111. The first stab-pixel 111 includes an infrared luminescent material 200 located on the display side, and the infrared luminescent material 200 is capable of emitting infrared light under the irradiation of light emitted by the first sub-pixel 111, whereby the infrared light may be used for fingerprint recognition, iris recognition, face recognition, etc.

Here, the "light emitted by the first sub-pixel 111" may be light transmitted through the first sub-pixel 111 or light emitted by the first sub-pixel 111 itself, and the embodiment of the present disclosure is not limited thereto. For example, the pixel unit 100 may include a light valve structure to allow backlight from the back side of the light valve structure to pass through or not, and the pixel unit 100 may also be a self-luminous pixel unit, so that when the display panel 10 is working, it is possible to control whether the first sub-pixel 111 allows backlight to pass through or whether the first sub-pixel 111 emits light itself, so as to further control whether the infrared light emitting material 200 emits infrared light.

For example, in an example, as shown in FIG. 1A, the pixel unit 100 includes a light valve structure 001. In the first sub-pixel 111, the light valve structure 001 may allow light (i.e., backlight) emitted from the backlight 002 to pass through or not allow backlight to pass through, thereby controlling whether light is irradiated to the infrared light emitting material 200. In the scenario where the light valve structure 001 allows backlight to pass through and irradiate the infrared luminescent material 200, the infrared luminescent material 200 emits infrared light under the excitation of light. In this way, infrared light may be emitted without an infrared light source. For example, the light valve structure 001 may be a liquid crystal light valve structure, an electronic ink light valve structure, or other suitable light valve structures, and the embodiments of the present disclosure are not limited thereto.

For example, in another example, as shown in FIG. 1B, the pixel unit 100 is a self-luminous pixel unit, for example, an Organic Light Emitting Diode, OLED) pixel unit. Each sub-pixel of the OLED pixel unit includes a light emitting element 003 (e.g., OLED), and in the first sub-pixel 111, the light emitting element 003 may emit light or not, thereby controlling whether light is irradiated to the infrared light emitting material 200. In the scenario where the light emitting element 003 emits light, the light irradiates the infrared light emitting material 200, so that the infrared light emitting, material 200 emits infrared light under the excitation of light. In this way, the pixel unit 100 may emit infrared light without additionally including an infrared light source.

For example, in the first sub-pixel 111, the infrared light emitting material 200 is located on the display side, that is, infrared light emitted by the infrared light emitting material 200 may be irradiated to any part of a user such as finger, eye or face for realizing fingerprint recognition, iris recognition, face recognition or other functions. For example, the infrared light emitting material 200 is disposed in the first sub-pixel 111, and whether or not the infrared light emitting material 200 emits infrared light may be controlled by controlling whether or not the first sub-pixel 111 emits light (i.e., allowing the backlight to pass through or emitting light itself, or not allowing the backlight to pass through or not emitting light), so as to realize corresponding functions.

For example, the first pixel unit 110 may further include a second sub-pixel 112, a third sub-pixel 113, and a fourth sub-pixel 114, and the colors of the light emitted by the second sub-pixel 112, the third sub-pixel 113, and the fourth sub-pixel 114 are different to realize a color display function. For example, in an example, the second subpixel 112 is a red (R) subpixel, the third subpixel 113 is a green (G) subpixel, and the fourth subpixel 114 is a blue (B) subpixel. Thus, the first pixel unit 110 includes both RGB (Red, Green, Blue) sub-pixels for displaying images and the first sub-pixel 111 for emitting infrared light. Therefore, whether or not the first sub-pixel 111 emits infrared light does not affect the normal color display function, it should he noted that in the embodiment of the present disclosure, the colors of the light emitted by the second sub-pixel 112, the third sub-pixel 113, and the fourth sub-pixel 114 are not limited, and may be R, G, B, or any combination of other basic colors for realizing a color display, and the embodiment of the present disclosure is not limited to this.

For example, in the display panel 10, all of the pixel units 100 may be the first pixel units 110, that is, all of the pixel units 100 include the first sub-pixels 111 for emitting infrared light, or only part of the pixel units 100 may be the first pixel units 110 while another part of the pixel units 100 may be used for displaying images only. For example, in an example, as shown in FIG. 2, the pixel unit 100 further includes a second pixel unit 120, and the second pixel unit 120 includes a fifth subpixel 121, a sixth subpixel 122, a seventh subpixel 123, and an eighth subpixel 124. For example, the second pixel unit 120 is only used for displaying images, and the colors of the light emitted by the fifth subpixel 121, the sixth subpixel 122, the seventh subpixel 123, and the eighth subpixel 124 are different. For example, the colors of the light emitted by the fifth sub-pixel 121, the sixth sub-pixel 122, and the seventh sub-pixel 123 are identical to the colors of the light emitted by the second sub-pixel 112, the third sub-pixel 113, and the fourth sub-pixel 114, for example, R, B, and the eighth sub-pixel 124 is a white sub-pixel. Thus, the second pixel unit 120 may perform displaying images based on the four primary colors of RGBW (Red, Green, Blue, White), thereby improving the display quality.

By providing the first sub-pixel 111 in a part of the pixel units 100 (the first pixel units 110) in the display panel 10, the first sub-pixel 111 may be provided only at a position required by the display panel 10, so that the influence on the display effect and the display quality may be reduced as much as possible while satisfying the requirements such as the light emission intensity and the light emission direction of the infrared light. It should be noted that in the embodiment of the present disclosure, the setting position of the first pixel unit 110 is not limited and may be set at any position in the display panel 10, such as a center area or an edge area, which may be determined according to actual requirements. The setting position of the first sub-pixel 111 in the first pixel unit 110 is also not limited, and the arrangement order of the first sub-pixel 111, the second sub-pixel 112, the third sub-pixel 113, and the fourth sub-pixel 114 may be determined according to actual requirements.

In the embodiment of the present disclosure, by disposing the infrared light emitting material 200 in the first sub-pixel 111, the display panel 10 may emit infrared light without an infrared light source and does not affect the normal display function. For example, since the infrared light emitting material 200 is disposed in the first sub-pixel 111, the structure of the conventional display panel is slightly changed, so that it is possible to be compatible with the structure of the conventional display panel, and the process difficulty is low. The infrared luminescent material 200 may be selected according to requirements, for example, it may be red-light excited infrared luminescent material, blue-light excited infrared luminescent material, etc. it may be organic luminescent material or inorganic luminescent material, and the emitted infrared light may be far infrared light, mid-infrared light or near-infrared light, etc. The embodiments of the present disclosure are not limited thereto. For example, the infrared luminescent material 200 may be a rare earth element complex, an organic ionic dye, an organic nonionic luminescent material, or the like, as long as it may be excited by light.

Figure 3A:
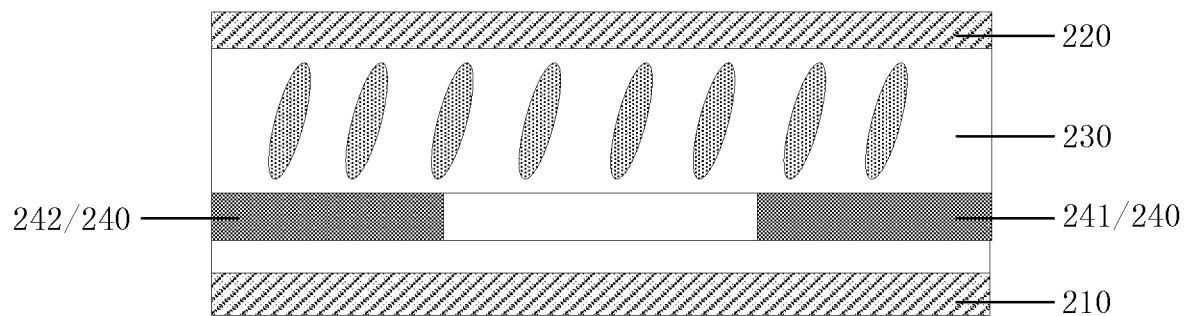
FIG. 3A and FIG. 3B are schematic cross-sectional views of a liquid crystal light valve structure of an exemplary display panel according to at least an embodiment of the present disclosure.
Figure 3B:
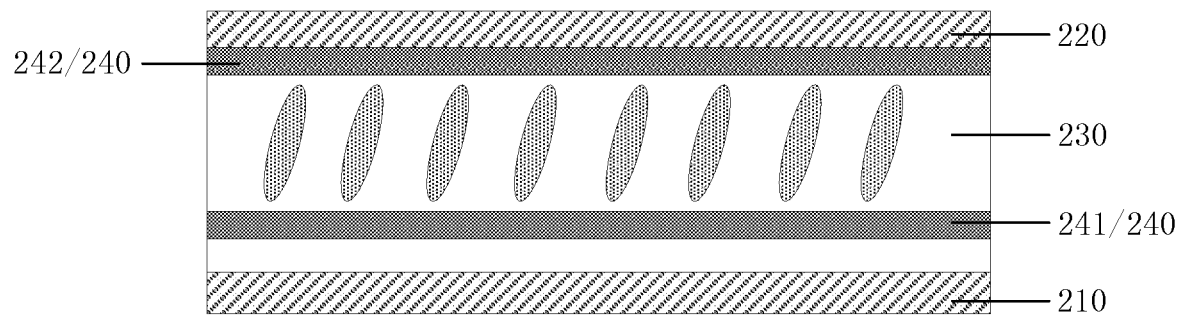

FIG. 3A and FIG. 3B are schematic cross-sectional views of a liquid crystal light valve structure of an exemplary display panel according to at least an embodiment of the present disclosure. In the scenario where the pixel unit 100 of the display panel 10 includes a light valve structure 001, the light valve structure 001 may be a liquid crystal light valve structure, that is, the display panel 10 is a liquid crystal display panel. The structure of the liquid crystal light valve is the basic structure of sub-pixels of the liquid crystal display panel, which may be of various types, such as a horizontal electric field type, a vertical electric field type, etc., and the horizontal electric field type further includes an in-plane switching (IPS) type, a fringe field switching (FFS) type, etc. Similarly, in the scenario where the light valve structure 001 is of an electronic ink light valve structure, the display panel 10 is an electronic ink display panel, Referring to FIG. 3A and FIG. 3B, the liquid crystal light valve structure includes a first polarizer 210, a second polarizer 220, and a liquid crystal layer 230. The liquid crystal layer 230 is sandwiched between the first polarizer 210 and the second polarizer 220, and polarization directions of the first polarizer 210 and the second polarizer 220 are perpendicular to each other, for example. The liquid crystal light valve structure, further includes a control electrode 240 configured to control the deflection of liquid crystal molecules in the liquid crystal layer 230 to adjust light transmittance, thereby adjusting the light transmittance of the liquid crystal light valve structure.

For example, the control electrode 240 includes a first sub-control electrode 241 and a second sub-control electrode 242, which may correspond to a pixel electrode and a common electrode of sub-pixels, respectively, and the first sub-control electrode 241 and the second sub-control electrode 242 are insulated from each other.

The liquid crystal light valve structure shown in FIG. 3A is of a horizontal electric field type, and the first sub-control electrode 241 and the second sub-control electrode 242 are substantially located in the same plane on the same substrate, for example, in the same plane on the array substrate, thereby forming a horizontal electric field for controlling the deflection of liquid crystal molecules therebetween during the working processes. In another example of a horizontal electric field, the first sub-control electrode 241 and the second sub-control electrode 242 may be located in different planes on the array substrate, thereby also forming a horizontal electric field for controlling the deflection of liquid crystal molecules therebetween during the working processes. For example, the first sub-control electrode 241 and the second sub-control electrode 242 are comb-shaped electrodes, and branch electrodes of the first sub-control electrode 241 are spaced apart from those of the second sub-control electrode 242.

The structure of the liquid crystal light valve shown in FIG. 3B is of a vertical electric field type, and the first sub-control electrode 241 and the second sub-control electrode 242 are located on different substrates and are opposite to each other, for example, on the array substrate and the opposite substrate respectively, thereby forming a vertical electric field (perpendicular to the plane of the display panel) for controlling the deflection of liquid crystal molecules between the two substrates during the working processes.

For example, the light emitted from the backlight 002 (not shown in the figure) becomes linearly polarized light after passing through the first polarizer 210, and the control electrode 240 controls the deflection angle of the liquid crystal molecules in the liquid crystal layer 230 to change the polarization direction of the linearly polarized light, thereby controlling; whether the linearly polarized light passes through the second polarizer 220 and controlling the corresponding light transmittance.

For example, in the case where no voltage is applied to the control electrode 240, that is, in the scenario where the voltage difference between the first sub-control electrode 241 and the second sub-control electrode 242 is zero, the light emitted from the backlight 002 becomes linearly polarized light after passing through the first polarizer 210, and the polarization direction of the linearly polarized light after passing through the liquid crystal layer 230 is unchanged, so that the linearly polarized light may not pass through the second polarizer 220, that is, the liquid crystal light valve structure is in a light shielding state, and the light transmittance is zero. For example, in the scenario where a voltage is applied to the control electrode 240, that is, in the scenario where there is a certain voltage difference between the first sub-control electrode 241 and the second sub-control electrode 242, the liquid crystal molecules in the liquid crystal layer 230 may he deflected by, for example, 90 degrees, and the light emitted from the backlight 002 becomes linearly polarized light after passing through the first polarizer 210, and the polarization direction of the linearly polarized light after passing through the liquid crystal layer 230 is deflected by 90 degrees, so that the linearly polarized light may all pass through the second polarizer 220, that is, the liquid crystal light valve structure is in a transparent state, and the light transmittance of the liquid crystal light valve structure is the maximum at this time. Thus, by adjusting the voltage applied to the control electrode 240, the deflection angle of the liquid crystal molecules in the liquid crystal layer 230 may be controlled, so that the liquid crystal light valve structure may be switch among a plurality of light transmittances to realize displaying a plurality of gray scales. In the scenario where the first sub-pixel 111 includes the liquid crystal light valve structure, the light emitted from the backlight 002 may pass through the liquid crystal light valve structure by controlling the voltage applied to each sub-electrode, thereby irradiating the infrared light emitting material 200, and further causing the infrared light emitting material 200 to emit infrared light.

It should be noted that in the embodiment of the present disclosure, the liquid crystal light valve structure may also include more or fewer components, and these components may refer to conventional designs, for example, and will not be described in detail here. The relationship between the polarization directions of the first polarizer 210 and the second polarizer 220 is not limited to being perpendicular to each other, but may be parallel to each other or at any angle as long as the liquid crystal light valve structure may have different light transmittance according to the applied control signal (voltage). The first polarizer 210 and the second polarizer 220 may be optical film polarizers or wire grid polarizers, and the optical films constituting the polarizers may be polyvinyl alcohol (PVA) films mixed with iodine molecules or two-phase dispersive dyes. The backlight 002 may be of various types, such as a direct type or a side type.

For example, in the display panel 10, a plurality of pixel units 100 may share the same first polarizer 210 and the same second polarizer 220, that is, the first polarizer 210 and the second polarizer 220 may cover the plurality of pixel units 100. For example, each sub-pixel in each pixel unit 100 has a control electrode 240, and therefore, the deflection angles of liquid crystal molecules corresponding to each sub-pixel in the liquid crystal layer 230 may be controlled respectively, thereby controlling whether backlight passes through each sub-pixel.

Figure 4:
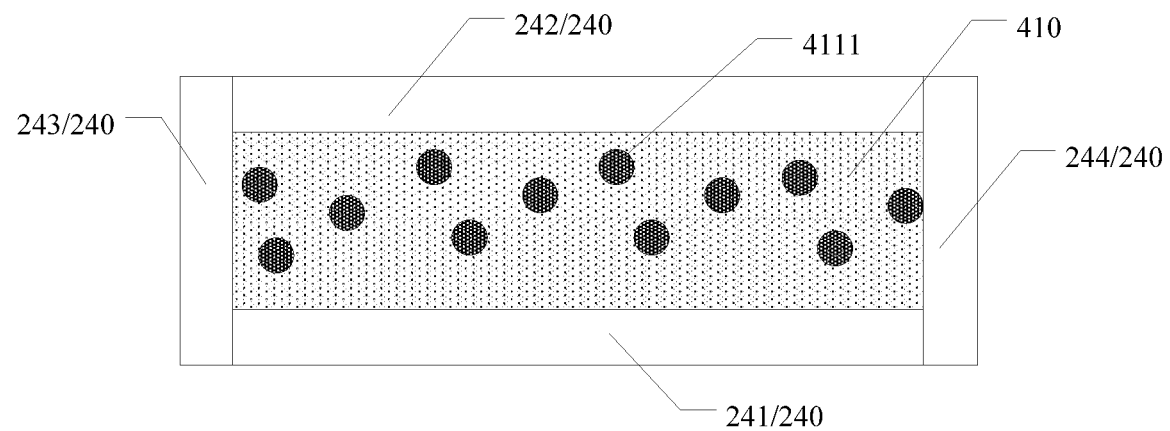
FIG. 4 is a schematic cross-sectional view of an electronic ink light valve structure of an exemplary display panel according to at least an embodiment of the present disclosure.
Figure 5A:
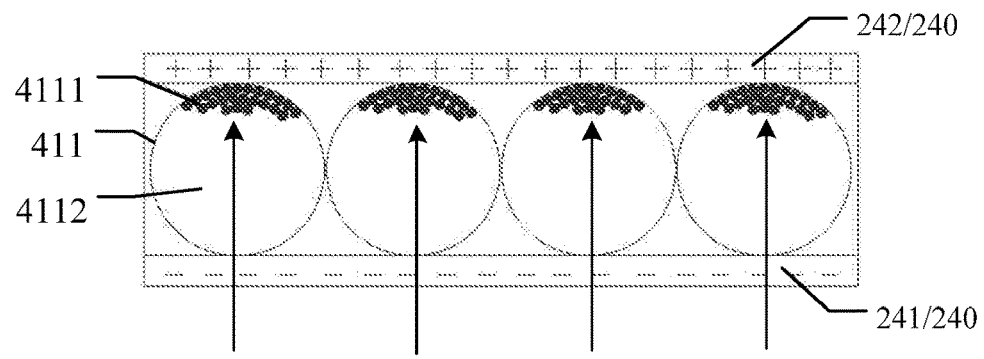
FIG. 5A and FIG. 5B are schematic partial views of an electronic ink light valve structure of an exemplary display panel provided by at least an embodiment of the disclosure.
Figure 5B:
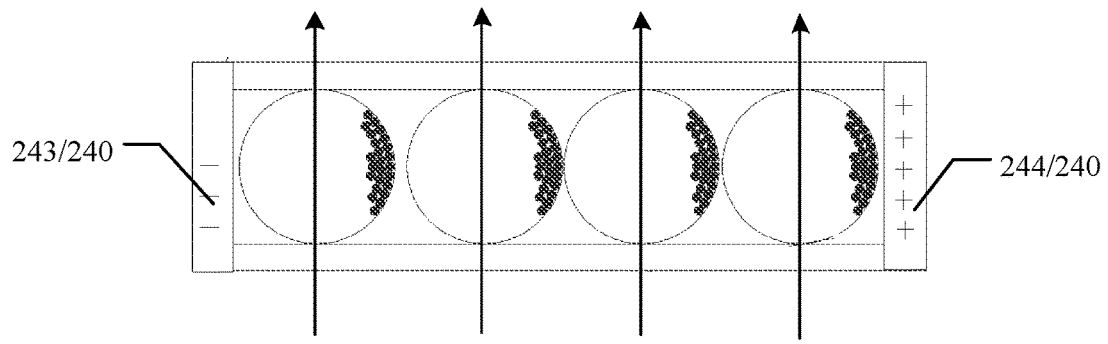

FIG. 4 is a schematic cross-sectional view of an electronic ink light valve structure of an exemplary display panel provided by at least an embodiment of the disclosure, and FIG. 5A and FIG. 5B are schematic partial views of an electronic ink light valve structure of an exemplary display panel provided by at least an embodiment of the disclosure. In the scenario where the pixel unit 100 of the display panel 10 includes a light valve structure 001, the light valve structure 001 may be an electronic ink light valve structure, that is, the display panel 10 is an electronic ink display panel.

For example, as shown in FIG. 4, the electronic ink light valve structure includes an electronic ink layer 410 and a control electrode 240, and the electronic ink layer 410 includes charged light shielding particles 4111. The control electrode 240 is configured to control the distribution of the charged light shielding particles 4111 in the electronic ink layer 410 to adjust the light transmittance of the electronic ink light valve structure. For example, in the event that the control electrode 240 is applied with a voltage, the electric field generated by the control electrode 240 may cause the charged light shielding particles 4111 to move within the electronic ink layer 410, thereby adjusting the distribution of the charged light shielding particles 4111 in the electronic ink layer 410 to control the light transmittance of the electronic ink light valve structure.

For example, as shown in FIG. 5A and FIG. 5B, the electronic ink layer 410 includes a plurality of capsules 411 filled with electrophoretic fluid 4112 and charged light shielding particles 4111 suspended in the electrophoretic fluid 4112. The plurality of capsules 411 are arranged side by side, and in the process of switching the light transmittance of the electronic ink light valve structure, the moving distance of the charged light shielding particles 4111 may be reduced, thereby reducing the response time of the electronic ink light valve structure, preventing the charged light shielding particles 4111 from locally gathering, being beneficial to the uniform distribution of the charged light shielding particles 4111 in the electronic ink layer 410, and improving the precision of adjusting the light transmittance of the electronic ink light valve structure.

For example, as shown in FIG. 5A and FIG. 5B, the control electrode 240 includes a first sub-control electrode 241, a second sub-control electrode 242, a third sub-control electrode 243, and a fourth sub-control electrode 244. The first sub-control electrode 241 and the second sub-control electrode 242 are oppositely disposed, and the first sub-control electrode 241 and the second sub-control electrode 242 are respectively disposed on two main surfaces of the electronic ink layer 410 in a direction perpendicular to the display panel. The third sub-control electrode 243 and the fourth sub-control electrode 244 are oppositely disposed, and in a direction parallel to the display panel, the third sub-control electrode 243 and the fourth sub-control electrode 244 are respectively disposed on opposite side surfaces of the electronic ink layer 410. In this way, by controlling the voltages on the first sub-control electrode 241, the second sub-control electrode 242, the third sub-control electrode 243, and the fourth sub-control electrode 244, the charged light shielding particles 4111 may be collected at the main surface of the electronic ink layer 410 (e.g., the main surface is parallel to the surface of the display panel), thereby reducing the light transmittance of the electronic ink light valve structure, i.e., the electronic ink light valve structure is in a light shielding state; or the charged light shielding particles 4111 are caused to be collected at the side surface of the electronic ink layer 410 (for example, the side surface is perpendicular to the surface of the display panel), thereby increasing the light transmittance of the electronic ink light valve structure, i.e., the electronic ink light valve structure is in a transparent state.

For example, the first sub-control electrode 241, the third sub-control electrode 243, and the fourth sub-control electrode 244 may all be located on the array substrate, and the second sub-control electrode 242 may be located on the opposite substrate.

For example, as shown in FIG. 5A and FIG. 5B, in the electronic ink light valve structure, the charged light shielding particles 4111 may have negative charges. As shown in FIG. 5A, a negative voltage is applied to the first sub-control electrode 241 and a positive voltage is applied to the second sub-control electrode 242 to form an electric field directed from the second sub-control electrode 242 to the first sub-control electrode 241. Negatively charged light shielding particles 4111 are collected on the side of the capsule 411 adjacent to the second sub-control electrode 242, so light from the backlight 002 (not shown in the figure) may not pass through the electronic ink light valve structure, which is in a light shielding state. As shown in FIG. 5B, a negative voltage is applied to the third sub-control electrode 243 and a positive voltage is applied to the fourth sub-control electrode 244 to form an electric field directed from the fourth sub-control electrode 244 to the third sub-control electrode 243, negatively charged light shielding particles 4111 are collected on the side of the capsule 411 adjacent to the fourth sub-control electrode 244, so that light from the backlight 002 may pass through the electronic ink light valve structure, which is in a transparent state.

It should be noted that the charged light shielding particles 4111 in the electronic ink light valve structure may also have positive charges. During the working processes, corresponding voltages are applied to the first sub-control electrode 241, the second sub-control electrode 242, the third sub-control electrode 243, and the fourth sub-control electrode 244 according to actual requirements, which will not he described in detail here. In addition, the present disclosure does not limit the setting of the control electrode 240 in the electronic ink light valve structure as long as the control electrode 240 may enable the electronic ink light valve structure to switch among different light transmittance.

For example, in the scenario where a voltage is applied to the first sub-control electrode 241 and the second sub-control electrode 242, the charged light shielding particles 4111 are collected on the side of the capsule 411 adjacent to the second sub-control electrode 242, that is, the electronic ink light valve structure is in a light shielding state, its light transmittance is zero, and the light emitted from the backlight 002 may not pass through the electronic ink light valve structure. For example, in the scenario where a voltage is applied to the third sub-control electrode 243 and the fourth sub-control electrode 244, the charged light shielding particles 4111 are collected on the side of the capsule 411 adjacent to the fourth sub-control electrode 244, that is, the electronic ink light valve structure is in a transparent state, at which time the light transmittance is maximum, and the light emitted from the backlight 002 may pass through the electronic ink light valve structure. In the scenario where the first sub-pixel 111 includes the electronic ink light valve structure, by controlling the voltage applied to each sub-electrode, light emitted from the backlight 002 may pass through the electronic ink light valve structure, thereby irradiating the infrared light emitting material 200, and further causing the infrared light emitting material 200 to emit infrared light.

It should he noted that in the embodiment of the present disclosure, the electronic ink light valve structure may also include more or fewer components, and these components may refer to conventional designs, for example, and will not be described in detail here.

Figure 6:
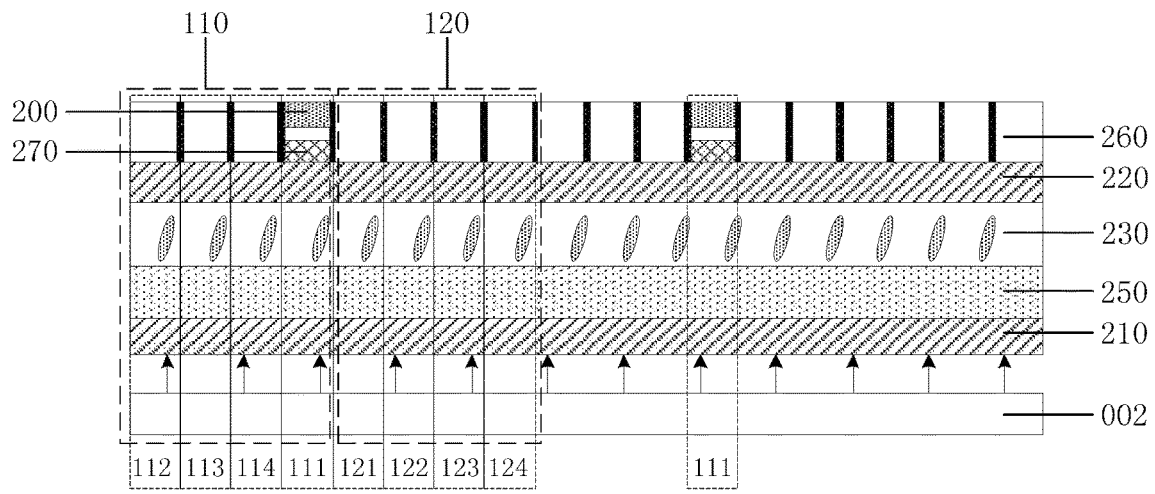
FIG. 6 is a schematic cross-sectional view of a display panel according to at least an embodiment of the present disclosure.

FIG. 6 is a schematic cross-sectional view of a display panel according to at least an embodiment of the present disclosure. Referring to FIG. 6, the display panel 20 is a liquid crystal display panel, which, for example, is an example of the display panel 10 shown in FIG. 1A. The display panel 20 includes a first polarizer 210, an array substrate 250, a liquid crystal layer 230, a second polarizer 220, and an opposite substrate 260 which are sequentially stacked. The display panel 20 further includes a backlight 002 disposed on a side of the first polarizer 210 away from the array substrate 250 and configured to provide backlight. This embodiment will be described with reference to the liquid crystal display panel of a horizontal electric field type as an example, but the embodiment of the present disclosure is not limited thereto.

For example, the first sub-pixel 111 includes a multilayer structure in a direction perpendicular to the array substrate 250, that is, a multilayer structure corresponds to the first sub-pixel 111 and includes a backlight 002, a first polarizer 210, an array substrate 250, a liquid crystal layer 230, a second polarizer 220, and an opposite substrate 260. Similarly, the second to fourth sub-pixels 112-114 and the fifth to eighth sub-pixels 121-124 also have corresponding multilayer structures. Accordingly, pixel driving circuits for these sub-pixels are respectively formed at positions of the array substrate 250 corresponding to these sub-pixels, and the pixel driving circuits include, for example, pixel electrodes, common electrodes, switching elements, etc (see FIG. 8). It should be noted that in the embodiment of the present disclosure, each sub-pixel may also include more or fewer components, which may depend on the specific structure of the display panel, and the embodiment of the present disclosure is not limited to this.

For example, each sub-pixel includes a liquid crystal light valve structure including a multilayer structure corresponding to each sub-pixel, and the multi-layer structure includes a first polarizer 210, an array substrate 250, a liquid crystal layer 230, a second polarizer 220, and an opposite substrate 260. For example, the liquid crystal light valve structure may control whether light backlight) emitted from the backlight 002 passes through, thereby controlling whether light is irradiated to the opposite substrate 260. For example, the polarization directions of the first polarizer 210 and the second polarizer 220 are perpendicular to each other. For example, the array substrate 250 includes a plurality of thin film transistors (not shown) as switching elements, and a voltage may be applied to the control electrode 240 in the liquid crystal light valve structure corresponding to each sub-pixel through the thin film transistors, thereby controlling the light transmittance of the liquid crystal light valve structure corresponding to each sub-pixel.

For example, in the first sub-pixel 111, the infrared light emitting material 200 is located on the opposite substrate 260. For example, the first sub-pixel 111 further includes an optical filter 270 disposed on the opposite substrate 260, and the optical filter 270 overlaps the infrared light emitting material 200. The optical filter 270 is closer to the array substrate 250 with respect to the infrared light emitting material 200 to filter backlight passing through the first polarizer 210, the array substrate 250, the liquid crystal layer 230, and the second polarizer 220 and cause the filtered light to irradiate the infrared light emitting material 200.

For example, in an example, the optical filter 270 is a blue light filter, and the infrared luminescent material 200 is a blue light excited infrared luminescent material, such as a blue light excited rare earth luminescent material. In the scenario where it is necessary to emit infrared light, the liquid crystal molecules in the liquid crystal layer 230 corresponding to the first subpixel 111 are deflected by, for example, 90 degrees, so that the light emitted from the backlight 002 passes through the first polarizer 210, the array substrate 250, the liquid crystal layer 230, and the second polarizer 220 and then impinges on the optical filter 270. Blue light with higher energy may pass through the optical filter 270, while light of other colors may not pass through the optical filter 270. The blue light irradiates the infrared luminescent material 200, thereby exciting the infrared luminescent material 200 and causing the infrared luminescent material 200 to emit infrared light. In the scenario where it is not necessary to emit infrared light, liquid crystal molecules corresponding to the first sub-pixel 111 in the liquid crystal layer 230 are not deflected, so that light emitted from the backlight 002 may not reach the optical filter 270, and thus the infrared light emitting material 200 does not emit infrared light. In this way, the display panel 20 may realize the function of emitting infrared light by utilizing the light emitted from the backlight 002 without providing an infrared light source, thus simplifying the structure of the display panel 20.

For example, in an example, the opposite substrate 260 is a color filter substrate, and the optical filter 270 and the infrared light emitting material 200 are both disposed in a region corresponding to the first subpixel 111 on the color filter substrate. For example, the color filter substrate also includes a first color filter, a second color filter, and a third color filter (not shown in the figure). For example, the first color filter is a red filter and is disposed in an area corresponding to the second sub-pixel 112 and the fifth sub-pixel 121 on the color filter substrate for realizing the red sub-pixel; the second color filter is a green filter and is disposed in the area corresponding to the third sub-pixel 113 and the sixth sub-pixel 122 on the color filter substrate far realizing the green sub-pixel; the third color filter is a blue filter and is disposed in a region corresponding to the fourth sub-pixel 114 and the seventh sub-pixel 123 on the color filter substrate for realizing the blue sub-pixel. For example, there is no filter in the region corresponding to the eighth subpixel 124 on the color filter substrate. Therefore, the display panel 20 may not only realize the function of emitting infrared light, but also display based on the four primary colors of RGBW. In this embodiment, the optical filter 270 and the infrared light emitting material 200 are disposed on a color filter substrate, and are suitable for a conventional display panel having a color filter substrate, so that it is possible to be compatible with the structure of the conventional display panel, and the process difficulty is low.

Figure 7:
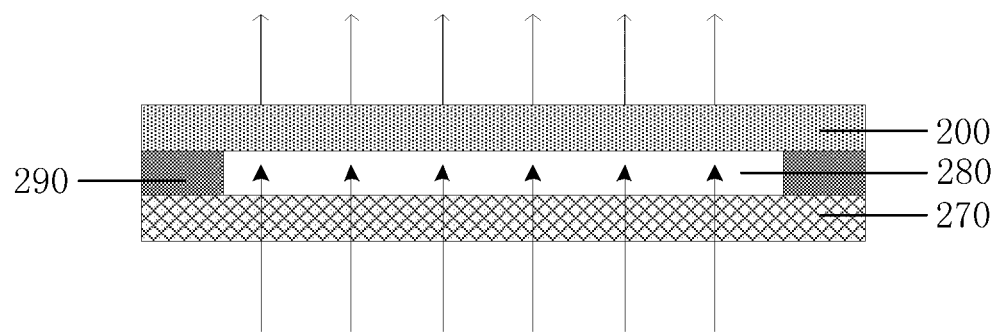
FIG. 7 is a schematic diagram of a layer structure of an optical filter and an infrared luminescent material of a display panel according to at least an embodiment of the present disclosure.

It should be noted that, in the embodiment of the present disclosure, the specific arrangement of the optical filter 270 and the infrared light emitting material 200 is not limited, and the infrared light emitting material 200 and the optical filter 270 may be bonded by connecting members, or other suitable arrangements may be adopted. For example, in an example, as shown in FIG. 7, the infrared light emitting material 200 and the optical filter 270 are bonded by an optical adhesive 290, and there is a gap 280 between the infrared light emitting material 200 and the optical filter 270. For example, in another example, the infrared light emitting material 200 may be directly disposed on the optical filter 270 so that there is no gap therebetween, thereby reducing the thickness.

Figure 8:
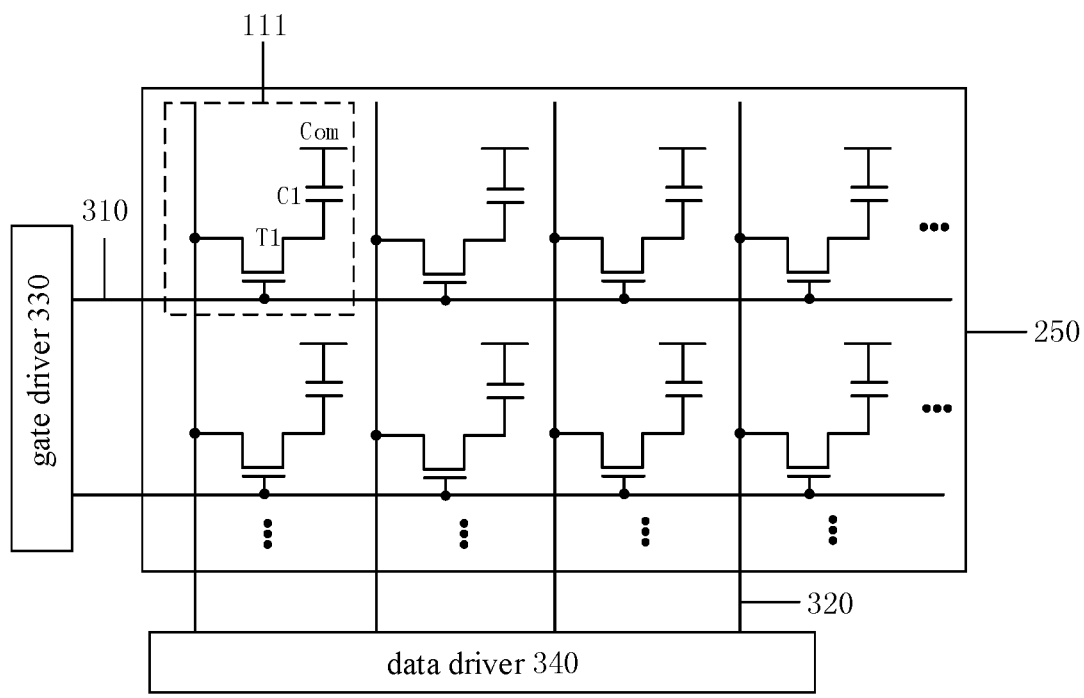
FIG. 8 is a schematic diagram of a driving circuit of a display panel according to at least an embodiment of the present disclosure.

FIG. 8 is a schematic diagram of a driving circuit of a display panel according to at least an embodiment of the present disclosure, for example, corresponding to the embodiments shown in FIG. 3A, FIG. 3B, FIG. 4, FIG. 5A, FIG. 5B and FIG. 6. Referring to FIG. 8, a plurality of scanning lines 310 and a plurality of data lines 320 are disposed on the array substrate 250 and intersect to define a plurality of sub-pixels. These sub-pixels are, for example, the aforementioned first to fourth sub-pixels 111-114 and the fifth to eighth sub-pixels 121-124. For example, a plurality of scan lines 310 are connected to a gate drive circuit 330 for driving the plurality of scan lines 310. The plurality of data lines 320 are connected to a data driver 340 for driving the plurality of data lines 320.

For example, the first sub-pixel 111 includes at least a first transistor T1 and a first capacitor (e.g., a liquid crystal capacitor) C1. The first transistor T1 serves as a switching element and is connected to the scanning line 310 and the data line 320, respectively. The first transistor T1 applies the data signal provided by the data line 320 to the first capacitor C1 to charge the first capacitor C1 under the control of the gate scanning signal provided by the scanning line 310, thereby applying voltages to the drive electrodes 240 (e.g., pixel electrodes and common electrodes) respectively connected to the two poles of the first capacitor C1 to control the deflection of the liquid crystal molecules corresponding to the first subpixel 111 in the liquid crystal layer 230, thereby realizing different light transmittances. The operation principle of the circuit in the other sub-pixels is similar to that of the first sub-pixel 111, and the operation principle of the display panel 20 may refer to a conventional design, and will not be described in detail here.

Figure 9:
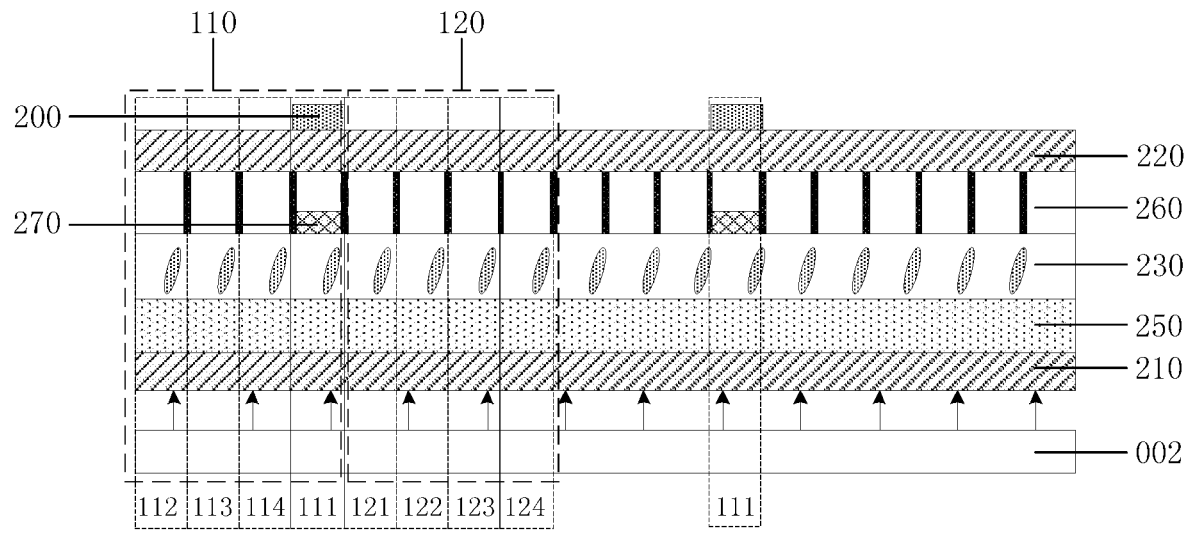
FIG. 9 is a schematic cross-sectional view of another display panel according to at least an embodiment of the present disclosure.

FIG. 9 is a schematic cross-sectional view of another display panel according to at least an embodiment of the present disclosure. Referring to FIG. 9, the display panel 20 of this embodiment is basically the same as the display panel 20 shown in FIG. 6, except that the positions of the infrared light emitting material 200, the second polarizer 220, and the opposite substrate 260 are different.

In this embodiment, the first polarizer 210, the array substrate 250, the liquid crystal layer 230, the opposite substrate 260, and the second polarizer 220 are sequentially stacked, that is, the second polarizer 220 in the display panel 20 of this embodiment is disposed on the opposite substrate 260 as compared with the display panel 20 shown in FIG. 6. In the first sub-pixel 111, the infrared luminescent material 200 is located on the second polarizer 220, and the optical filter 270 is still located on the opposite substrate 260. The working principle and technical effect of the display panel 20 may refer to the foregoing and will not be described here again.

In this embodiment, the second polarizer 220 is disposed on the opposite substrate 260, and the stacking sequence is the same as that of the conventional display panel, so the display panel 20 may be manufactured by the conventional process and sequence, and only the opposite substrate 260 including the polarizer 270 and the infrared light emitting material 200 are disposed on the second polarizer 220 are required during the liquid crystal cell forming process.

Figure 10:
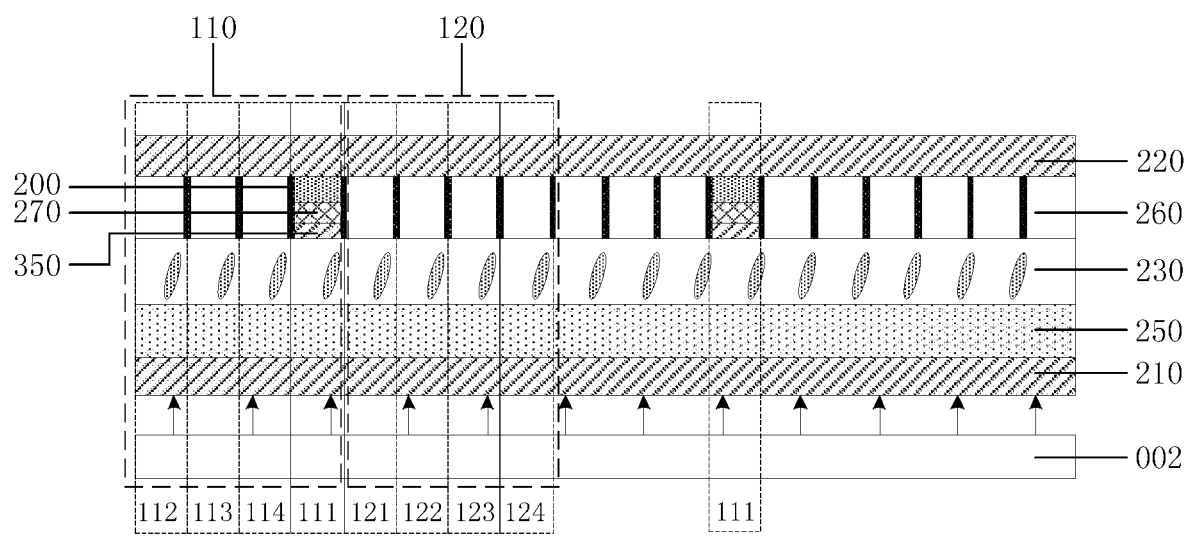
FIG. 10 is a schematic cross-sectional view of another display panel according to at least an embodiment of the present disclosure.

FIG. 10 is a schematic cross-sectional view of another display panel according to at least an embodiment of the present disclosure Referring to FIG. 10, the display panel 20 of this embodiment is substantially the same as the display panel 20 shown in FIG. 9, except that the infrared luminescent material 200 is disposed at different positions and further includes a third polarizer 350.

In this embodiment, in the first sub-pixel 111, the infrared light emitting material 200, the optical filter 270, and the third polarizer 350 are stacked on the opposite substrate 260. For example, the liquid crystal light valve structure corresponding to the first sub-pixel 111 further includes a third polarizer 350. For example, the polarization directions of the third polarizer 350 and the second polarizer 220 are identical, that is, in the scenario where the polarization directions of the second polarizer 220 and the first polarizer 210 are perpendicular to each other, the polarization directions of the third polarizer 350 and the first polarizer 210 are also perpendicular to each other, so that the function of controlling the light transmittance of the backlight in the first subpixel 111 may he realized.

In the scenario where it is necessary to emit infrared light, the liquid crystal molecules in the liquid crystal layer 230 corresponding to the first subpixel 111 are deflected by, for example, 90 degrees, so that the light emitted from the backlight 002 passes through the first polarizer 210, the array substrate 250, the liquid crystal layer 230, and the third polarizer 350 and then impinges on the optical filter 270. Light passing through the optical filter 270, such as residual blue light, irradiates the infrared light emitting material 200, thereby exciting the infrared light emitting material 200 so that the infrared light emitting material 200 emits infrared light. In the scenario where it is not necessary to emit infrared light, the liquid crystal molecules corresponding to the first subpixel 111 in the liquid crystal layer 230 are not deflected, so that the light emitted from the backlight 002 may not pass through the third polarizer 350, and thus the backlight may not reach the optical filter 270, and the infrared light emitting material 200 does not emit infrared light.

The stacked structure of the display panel 20 provided in this embodiment is the same as that of a conventional display panel, so the display panel 20 may be manufactured by a conventional process and sequence, and only the opposite substrate 260 including the third polarizer 350, the optical filter 270, and the infrared light emitting material 200 is required to be used in the liquid crystal cell forming process. For example, the third polarizer 350 is required to be disposed only in the region corresponding to the first subpixel 111 on the opposite substrate 260, and a large area is not required.

Figure 11A:
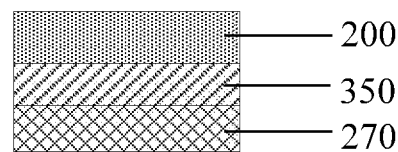
FIG. 11A and FIG. 11B are schematic diagrams of layer structures of a third polarizer, an optical filter and an infrared luminescent material of a display panel according to at least an embodiment of the present disclosure.
Figure 11B:
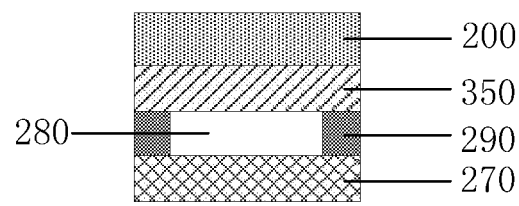

It should be noted that in the embodiment of the present disclosure, the relative positional relationship and the specific arrangement of the third polarizer 350 and the optical filter 270 are not limited and may be determined according to actual requirements. For example, the third polarizer 350 may be closer to the liquid crystal layer 230 relative to the optical filter 270 or further away from the liquid crystal layer 230 relative to the optical filter 270. For example, in an example, as shown in FIG. 10, the third polarizer 350, the optical filter 270, and the infrared light emitting material 200 are sequentially stacked. For example, in another example, as shown in FIG. 11A, the optical filter 270, the third polarizer 350, and the infrared light emitting material 200 are sequentially stacked, that is, the optical filter 270 is closer to the liquid crystal layer 230 relative to the third polarizer 350, and the infrared light emitting material 200 is disposed on the third polarizer 350. For example, in yet another example, as shown in FIG. 11B, the optical filter 270 and the third polarizer 350 are bonded by an optical adhesive 290, and there is a gap 280 between the optical filter 270 and the third polarizer 350.

Figure 12:
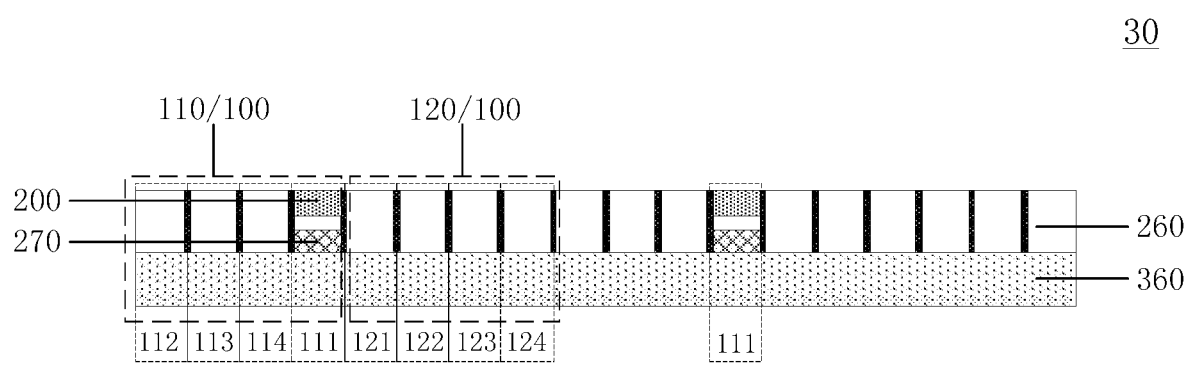
FIG. 12 is a schematic cross-sectional view of another display panel according to at least an embodiment of the present disclosure.

FIG. 12 is a schematic cross-sectional view of another display panel according to at least an embodiment of the present disclosure. Referring to FIG. 12, the display panel 30 is, for example, an example of the display panel 10 shown in FIG. 1B. The display panel 30 includes a self-luminous array substrate 360 and an opposite substrate 260 which are stacked. For example, the self-luminous array substrate 360 includes an organic light emitting diode (OLED) array or an inorganic light emitting diode array disposed on the base substrate, that is, the pixel unit 100 is a self-luminous pixel unit (e.g., an OLED pixel unit or an inorganic light emitting diode pixel unit), and the display panel 30 is an organic light emitting diode display panel or an inorganic light emitting diode display panel, correspondingly. For example, the infrared light emitting material 200 and the optical filter 270 are disposed on the opposite substrate 260. For example, the OLED array or the inorganic light emitting diode array is configured to emit white light, and the opposite substrate 260 is a color filter substrate.

In the scenario where it is necessary to emit infrared light, the OLED or inorganic light emitting light emitting diode corresponding to the first sub-pixel 111 emit light to irradiate the optical filter 270. Light passing through the optical filter 270, such as residual blue light, irradiates the infrared light emitting material 200, thereby exciting the infrared light emitting material 200 so that the infrared light emitting material 200 emits infrared light. In the scenario where it is not necessary to emit infrared light, the OLED or the inorganic light emitting diode corresponding to the first sub-pixel 111 is made not to emit light, so that no light reaches the optical filter 270, and thus the infrared light emitting material 200 does not emit infrared light. For example, regions corresponding to other sub-pixels on the opposite substrate 260 (color filter substrate) may be respectively provided with a first color filter, a second color filter or a third color filter, or no filters may be provided, thereby realizing normal color display functions, for example, displaying images based on RGBW's four primary colors. In this way; the display panel 30 may emit infrared light without an infrared light source, the normal display function is not affected, and it is possible to be compatible with the structure of a conventional display panel, thereby also reducing the manufacturing costs.

It should be noted that in the embodiment of the present disclosure, the layer structures of the display panel 20 and the display panel 30 are not limited to the layer structures shown in FIG. 6, FIG. 9, FIG. 10 and FIG. 12, but may also include more or fewer components, and the relative positional relationship of each component may be determined according to actual requirements, and the embodiment of the present disclosure is not limited thereto. The arrangement of the pixel units 100 of the display panel 20 or 30 and the arrangement of the sub-pixels in the pixel units 100 are not limited to the arrangement shown in FIG. 2, but may be other suitable pixel arrangements, and the embodiments of the present disclosure are not limited thereto. It should be understood by those of ordinary skill in the art that the display panel 20 or 30 may also include other components, which will not be described in detail herein and should be taken as limitations to the embodiments of the present disclosure.

At least an embodiment of the present disclosure further provides a display device including the display panel according to any embodiment of the present disclosure. The display device may emit infrared light without an infrared light source, the normal display function is not affected, and it is possible to be compatible with the structure of a display panel in a conventional display device, thereby also reducing the manufacturing costs.

Figure 13:
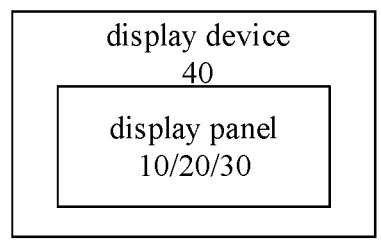
FIG. 13 is a schematic block diagram of a display device according to at least an embodiment of the present disclosure.

FIG. 13 is a schematic block diagram of a display device according to at least an embodiment of the present disclosure. Referring to FIG. 13, the display device 40 includes a display panel 10, a display panel 20, or a display panel 30, the display panel 10, the display panel 20, and the display panel 30 are display panels according to any embodiment of the present disclosure. For example, the display device 40 may be a liquid crystal display, a liquid crystal television, an OLED display, a OLED TV, etc., or may be any product or component having a display function and an infrared light emitting function such as an electronic book, a mobile phone, a tablet computer, a notebook computer, a digital photo frame, a navigator, etc. The embodiments of the present disclosure are not limited thereto. The technical effect of the display device 40 may refer to the corresponding descriptions of the display panel 10, the display panel 20, and the display panel 30 in the above-mentioned embodiments, and will not be described here again. It should be understood by those of ordinary skill in the art that the display device 40 may also include other components (e.g., control device, image data encoding/decoding device, clock circuit, etc.), which are not described in detail herein and should not be taken as limitations on the embodiments of the present disclosure.

At least an embodiment of the present disclosure also provides a driving method of the display panel, by which the display panel described in any embodiment of the present disclosure may be driven. According to the driving method, the display panel may emit infrared light without an infrared light source, the normal display function is not affected, and the driving method is compatible with the structure of a conventional display panel, so that the manufacturing cost may also he reduced.

For example, in an example, the driving method of the display panel includes: causing the first sub-pixel to emit light to irradiate the infrared light emitting material to cause the infrared light emitting material to emit infrared light; or, causing the first sub-pixel not to emit light so that the infrared light emitting material does not emit infrared light.

It should be noted that the detailed description and technical effects of the driving method may refer to the corresponding descriptions of the display panel 10, the display panel 20 and the display panel 30 in the embodiment of the present disclosure, and will not he repeated here.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

The above description is only a specific embodiment of the present disclosure, but the scope of protection of the present disclosure is not limited thereto, and the scope of protection of the present disclosure shall he subject to the scope of protection of the claims,

What is claimed is:

1. A display panel, comprising a plurality of pixel units, wherein the plurality of pixel units comprises a first pixel unit, the first pixel unit comprises a first sub-pixel, the first sub-pixel comprises:

a backlight source configured to provide backlight;
a light valve structure configured to allow backlight to pass or not; and
an infrared luminescent material on a display side of the display panel, the infrared luminescent material is capable of emitting infrared light under an irradiation of the backlight;
the light valve structure is a liquid crystal light valve structure and includes an array substrate and an opposite substrate,
the liquid crystal light valve structure comprises a first polarizer, a second polarizer, and a liquid crystal layer sandwiched between the first polarizer and the second polarizer,
polarization directions of the first polarizer and the second polarizer are perpendicular to each other;
the first polarizer, the array substrate, the liquid crystal layer, the opposite substrate, and the second polarizer are sequentially stacked, and the infrared luminescent material is on the opposite substrate in the first sub-pixel;
the first sub-pixel further comprises an optical filter overlapping the infrared luminescent material,
the optical filter is closer to the array substrate relative to the infrared luminescent material, and is configured to filter the backlight and cause the filtered backlight to irradiate the infrared luminescent material;
the light valve structure further comprises a third polarizer, wherein the third polarizer and the optical filter are stacked on the opposite substrate in the first subpixel, and
the third polarizer is closer to the liquid crystal layer relative to the optical filter; or, the optical filter is closer to the liquid crystal layer relative to the third polarizer, and the infrared luminescent material is on the third polarizer.

2. The display panel according to claim 1, wherein the opposite substrate is a color filter substrate and the optical filter is on the color filter substrate.

3. The display panel according to claim 1, wherein the optical filter is a blue light filter and the infrared luminescent material is a blue light excited infrared luminescent material.

4. The display panel according to claim 1, wherein polarization directions of the third polarizer and the second polarizer are identical.

5. The display panel according to claim 1, wherein the first pixel unit further comprises a second sub-pixel, a third sub-pixel and a fourth sub-pixel,
colors of light emitted by the second sub-pixel, the third sub-pixel and the fourth sub-pixel are different.

6. The display panel according to claim 5, wherein the second subpixel is a red subpixel, the third subpixel is a green subpixel, and the fourth subpixel is a blue subpixel.

7. The display panel according to claim 5, wherein the plurality of pixel units further comprises a second pixel unit, and the second pixel unit comprises a fifth sub-pixel, a sixth sub-pixel, a seventh sub-pixel and an eighth sub-pixel,
colors of light emitted by the fifth sub-pixel, the sixth sub-pixel and the seventh sub-pixel are identical to those of the second sub-pixel, the third sub-pixel and the fourth sub-pixel, respectively.

8. The display panel according to claim 7, wherein the eighth sub-pixel is a white sub-pixel.

9. A display device comprising a display panel, wherein the display panel comprises a plurality of pixel units, and the plurality of pixel units comprises a first pixel unit,
the first pixel unit comprises a first sub-pixel,
the first sub-pixel comprises:
a backlight source configured to provide backlight;
a light valve structure configured to allow backlight to pass or not; and
an infrared luminescent material on a display side of the display panel, the infrared luminescent material is capable of emitting infrared light under an irradiation of the backlight;
the light valve structure is a liquid crystal light valve structure and includes an array substrate and an opposite substrate,
the liquid crystal light valve structure comprises a first polarizer, a second polarizer, and a liquid crystal layer sandwiched between the first polarizer and the second polarizer,
polarization directions of the first polarizer and the second polarizer are perpendicular to each other;
the first polarizer, the array substrate, the liquid crystal layer, the opposite substrate, and the second polarizer are sequentially stacked, and the infrared luminescent material is on the opposite substrate in the first sub-pixel;
the first sub-pixel further comprises an optical filter overlapping the infrared luminescent material,
the optical filter is closer to the array substrate relative to the infrared luminescent material, and is configured to filter the backlight and cause the filtered backlight to irradiate the infrared luminescent material;
the light valve structure further comprises a third polarizer, wherein the third polarizer and the optical filter are stacked on the opposite substrate in the first subpixel, and
the third polarizer is closer to the liquid crystal layer relative to the optical filter; or, the optical filter is closer to the liquid crystal layer relative to the third polarizer, and the infrared luminescent material is on the third polarizer.

10. The display device according to claim 9, wherein the opposite substrate is a color filter substrate and the optical filter is located on the color filter substrate.

11. A driving method of a display panel, wherein the display panel comprises a plurality of pixel units, and the plurality of pixel units comprises a first pixel unit,
the first pixel unit comprises a first sub-pixel,
the first sub-pixel comprises:
a backlight source configured to provide backlight;
a light valve structure configured to allow backlight to pass or not; and
an infrared luminescent material on a display side of the display panel, the infrared luminescent material is capable of emitting infrared light under an irradiation of the backlight;
the light valve structure is a liquid crystal light valve structure and includes an array substrate and an opposite substrate,
the liquid crystal light valve structure comprises a first polarizer, a second polarizer, and a liquid crystal layer sandwiched between the first polarizer and the second polarizer,
polarization directions of the first polarizer and the second polarizer are perpendicular to each other;
the first polarizer, the array substrate, the liquid crystal layer, the opposite substrate, and the second polarizer are sequentially stacked, and the infrared luminescent material is on the opposite substrate in the first sub-pixel;

the first sub-pixel further comprises an optical filter overlapping the infrared luminescent material, the optical filter is closer to the array substrate relative to the infrared luminescent material, and is configured to filter the backlight and cause the filtered backlight to irradiate the infrared luminescent material;

the light valve structure further comprises a third polarizer, wherein the third polarizer and the optical filter are stacked on the opposite substrate in the first subpixel, and the third polarizer is closer to the liquid crystal layer relative to the optical filter; or, the optical filter is closer to the liquid crystal layer relative to the third polarizer, and the infrared luminescent material is on the third polarizer, the driving method comprises:
   causing the backlight emitted by the backlight source to irradiate the infrared luminescent material to cause the infrared luminescent material to emit infrared light; or,
   causing the backlight source not to emit backlight so that the infrared light emitting material does not emit infrared light.

\* \* \* \* \*